Figure 1:
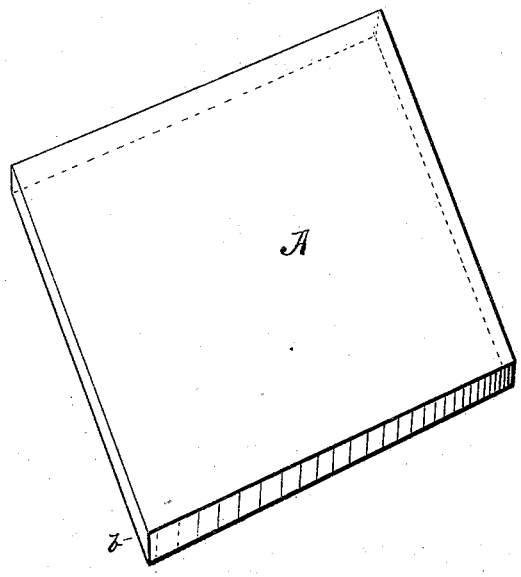

(No Model.) 2 Sheets—Sheet 1.

E. W. BALL.
TILE.

No. 427,657. Patented May 13, 1890.

(No Model.) 2 Sheets—Sheet 2.

E. W. BALL.
TILE.

No. 427,657. Patented May 13, 1890.

WITNESSES:

INVENTOR
Edward W. Ball
BY Gifford & Brown
HIS ATTORNEYS

UNITED STATES PATENT OFFICE.

EDWARD W. BALL, OF BROOKLYN, ASSIGNOR OF ONE-HALF TO THE LALANCE & GROSJEAN MANUFACTURING COMPANY, OF NEW YORK, N. Y.

TILE.

SPECIFICATION forming part of Letters Patent No. 427,657, dated May 13, 1890.

Application filed July 31, 1889. Serial No. 319,265. (No model.)

*To all whom it may concern:*

Be it known that I, EDWARD W. BALL, a citizen of the United States, residing at Brooklyn, in Kings county, and State of New York, have invented a new and useful Improvement in Tiles, of which the following is a specification.

The object of this invention is to provide a light, durable tile or covering for walls, ceilings, wainscoting, and hearth decorations. The use of the clay or earthen tile is limited on account of weight and cost of application, as to be properly and durably set, they require workmen specially skilled in the art, and the process of setting them is slow and expensive, and in places remote from large centers workmen skilled in the art are difficult to obtain. Their weight and liability to become detached also limit their use in overhead work and in many other places.

My invention consists in a metal plate having inwardly-inclined flanges, and which can be enameled or glazed to exactly simulate the usual clay or earthen tile in common use. In applying them it is intended to coat the lathing or surface to be covered with fresh mortar or cement and press the tiles to their places, which it will be readily seen can be done rapidly and cheaply by unskilled labor. When the mortar or cement is dry, these tiles will be more firmly affixed than the clay or earthen tile. It will be observed that, if desired, they can be made of very thin material, as the plaster or cement which forces itself into the back in applying them gives them a firm backing and support. They would also be useful in many places where the vibration would soon loosen the earthen or clay tile, and where the lightness of this improved tile would be of great advantage, such as railway-cars and ships. These sheet-metal tiles may be made by dies, so as to be exactly true and uniform in size. They will, when so produced, make better joints, and when laid will present a handsomer appearance than the clay or earthen tile in which more or less irregularity is unavoidable on account of the burning or firing necessary in their manufacture.

The advantages of my invention are therefore, besides those of manufacture, simplicity, rapidity, cheapness in application, and greater tenacity when set. Their light weight is advantageous, in that they add but little weight to the structure to which they are applied. As the tiles are to be inserted in wet plaster or cement, the flanges have a slight inward inclination or are corrugated or perforated to give them additional hold.

Figure 2:
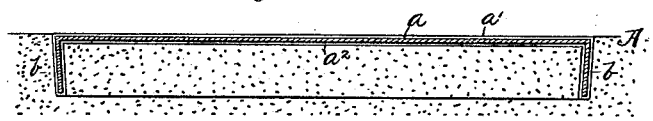
Figure 3:
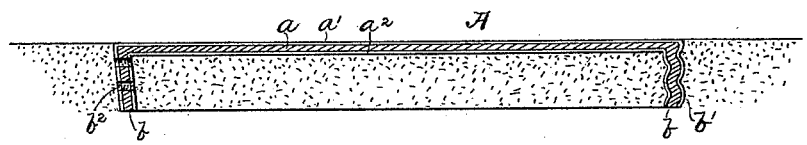

Referring to the drawings, Figure 1 is a perspective view of a tile embodying my invention, and Fig. 2 is a transverse section through the center of the tile and a bed or mass of mortar or cement. Fig. 3 is a transverse section of a tile of modified construction.

Similar letters of reference designate corresponding parts in all the figures.

Referring by letter to the drawings, A designates the tile. It has in the present example a metal body portion $a$ and a glazing or enamel coating $a'$ $a^2$. The body portion $a$ is light sheet metal and is shown as having flanges $b$. Flanges may be formed at all the edges or at two opposite edges only.

The tiles are intended to be inserted in wet mortar or cement. Their flanges may advantageously have a slight inclination inwardly or toward one another; or their flanges may be corrugated or perforated. In Fig. 3 I have shown a flange having corrugations $b'$ projecting transversely to the width of the flange, and another flange having perforations $b^2$, which extend transversely through the flange and provide interlocking surfaces. The construction of the flanges in the manner described will render it possible to secure the tiles more perfectly than otherwise they could be conveniently secured, as then they will have transverse interlocking projections or transversely-extending surfaces between the edge of the flange and body portion with which the mortar or cement will engage.

The body portion $a$, as shown, is glazed or enameled on all its surfaces, as at $a'$ $a^2$. If a suitable glaze or enameling material be used, the metal will be protected from dampness from the wall or the outer atmosphere.

In the drawings I show the tile as having a rectangular form. It is evident, however, that the outline may be changed. The exposed surface may have embossed figures or be otherwise ornamented.

What I claim as my invention, and desire to secure by Letters Patent, is—

1. A tile comprising a sheet-metal body portion glazed or enameled on both its surfaces and having flanges at an angle to the body portion, substantially as specified.

2. A tile comprising a metal body portion having edge flanges inclined inwardly, substantially as specified.

3. A tile comprising a metal body portion provided with flanges having transversely-extending surfaces between the edges and the body, substantially as specified.

EDWARD W. BALL.

Witnesses:
W. S. HOLBROOK,
JAS. COCHRAN.